Sept. 1, 1964 P. BRADY 3,146,921
SELF CONTAINED MEASURING SPOUT FOR COFFEE CONTAINERS
Filed July 29, 1963 2 Sheets-Sheet 1
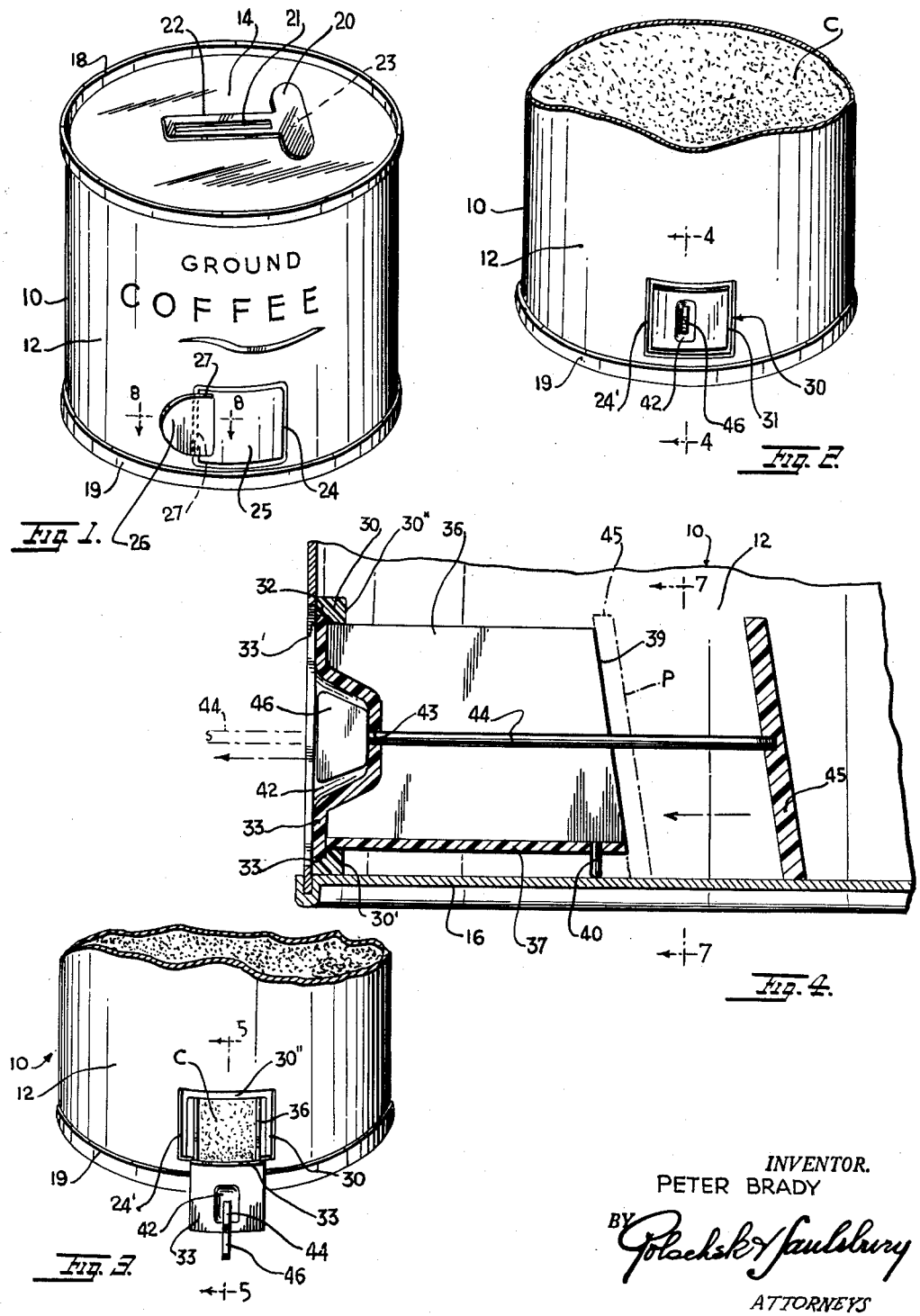
INVENTOR.
PETER BRADY
BY Polachek & Saulsbury
ATTORNEYS

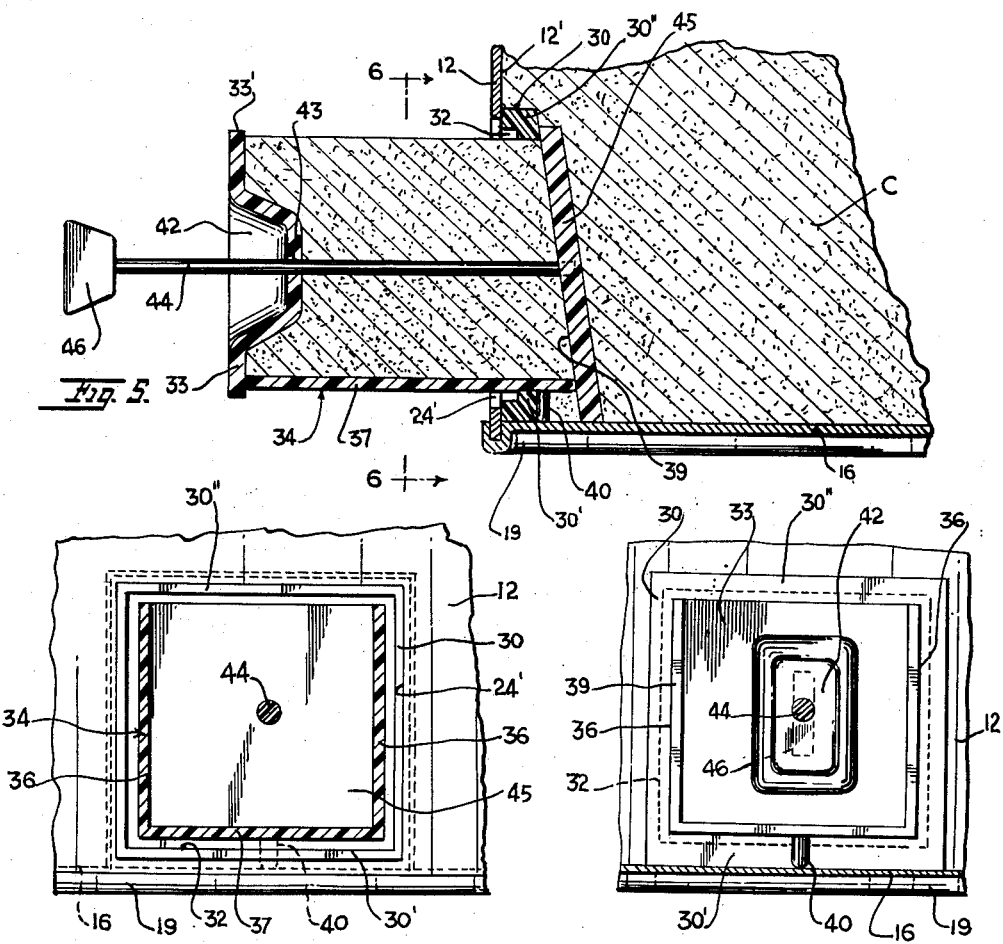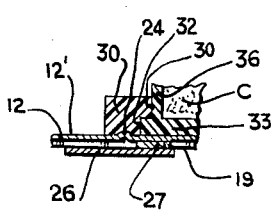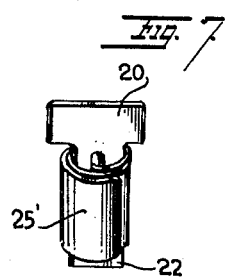

United States Patent Office 3,146,921
Patented Sept. 1, 1964

3,146,921
SELF CONTAINED MEASURING SPOUT FOR
COFFEE CONTAINERS
Peter Brady, 964 Anderson Ave., Bronx, N.Y.
Filed July 29, 1963, Ser. No. 298,079
9 Claims. (Cl. 222—361)

This invention concerns a self-contained measuring spout for a container of coffee or other powdered or granular material.

Ground coffee containers of the most widely distributed type at present are hermetically sealed cans generally provided with a key for twisting off a closure strip at one end of the can. This leaves a removable can end or cover which serves as a closure for the can. It has been found that there is a considerable loss in freshness, aroma and flavor through this loosely fitting can cover once the sealing strip is removed. When the cover is removed to expose the ground coffee for taking out a required amount, a further loss in freshness, aroma and flavor occurs. The conventional coffee can has no means for measuring out a predetermined quantity of coffee to brew a single cup or a plurality of cups of beverage.

The present invention overcomes the disadvantages and shortcomings of conventional ground coffee cans in a novel fashion. In addition, the invention includes a coffee measuring and dispensing spout which preserves the freshness, aroma and flavor of the ground coffee in the can at all times.

It is therefore one object of the invention to provide a novel self-contained measuring and dispensing spout for a container of granular material.

Another object is to provide a novel closure for a container of granular material.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is an oblique side and top view of a ground coffee container embodying the invention.

FIG. 2 is a fragmentary oblique view of the coffee container with a closure strip removed, and with spout shown closed.

FIG. 3 is a view similar to FIG. 2 with spout shown opened.

FIG. 4 is a fragmentary sectional view on an enlarged scale, taken on line 4—4 of FIG. 2, the ground coffee being omitted to show all parts more clearly.

FIG. 5 is a sectional view similar to FIG. 4, but taken on line 5—5 of FIG. 3.

FIG. 6 is a cross-sectional view taken on line 6—6 of FIG. 5.

FIG. 7 is a cross-sectional view taken on line 7—7 of FIG. 4.

FIG. 8 is a fragmentary sectional view on an enlarged scale taken on line 8—8 of FIG. 1.

FIG. 9 is an oblique top and side view of a key and removed closure strip.

Referring to the drawings, there is shown a can 10 having a cylindrical side wall 12, circular top wall 14 and circular bottom wall 16 secured by beads 18, 19 to opposite peripheral edges of the side wall. The can contains a quantity of ground coffee C. On the top wall 14 is a removable key 20. This key has a longitudinal slot 21 in its shank 22. The key is held by a spot weld 23 to the top wall 14.

In the side wall 12 near the bottom bead 19 is a generally rectangular scored groove or crease 24 which permits a rectangular metal piece 25 to be removed from the side wall. A narrow tongue or tab 26 is secured to the piece 25 by a weld 27; see FIGS. 1 and 8. The tab can be engaged in the slot 21 of the key and the key can be turned to remove piece 25 as a spiral metal strip 25' as shown in FIG. 9.

When the piece 25 is removed it leaves a generally rectangular opening 24' in the side wall 12 near the bottom as clearly shown in FIGS. 2–6. On the inner side 12' of wall 12 and applied during manufacture of the can is a resilient plastic or rubber gasket 30. This gasket is rectangular in form and is juxtaposed to groove 24. When piece 25 is removed the inner edge 31 of the gasket extends inwardly of opening 24' all around the opening.

The gasket 30 has a rectangular recess 32 formed in its front face. This recess snugly receives the periphery of rectangular front panel 33 of a spout 34. The spout is preferably formed of plastic material but it could be of metal or other suitable rigid material. The front panel has integral, parallel side panels 36 and a bottom panel 37 connected to the front panel inwardly of the side edges 33' of the panel. The top and rear of the spout are open. The rear or inner edges 39 of side panels 36 are slanted inwardly and rearwardly downward; see FIG. 4. A peg or pin 40 is secured to the bottom panel 37 forwardly of its rear edge. This peg rests and rides on the upper side of the can bottom 16. This peg holds the bottom panel 37 horizontal and parallel to the can bottom.

The front panel 33 has a molded recessed depression or concavity 42 formed therein. This depression is generally oval or oblong in cross section. At the inner face of this depression and centered therein is a hole 43. A shaft 44 is slidably disposed in this hole. This shaft extends inwardly of the can between the side panels 36 and terminates at a rectangular plastic plate 45. The outer or front end of the shaft 44 is secured to a tapered knob or handle 46. The outer edge of the handle is parallel with the outer side of panel 33.

FIGS. 2 and 4 show the spout in a closed position. The handle 46 and shaft 44 are retracted, and plate 45 is spaced from but parallel to the slanted rear edges 39 of side panels 36, rearwardly of the spout.

If the handle 46 is grasped manually and pulled forwardly while the panel 33 is either frictionally gripped in recess 32 of the gasket or is held manually stationary, then the plate 45 will be advanced to the dotted line position P shown in FIG. 4. The ground coffee between the plate 45 and the spout will be pushed by the plate into the spout or will move aside if the spout is full until the plate is stopped at edges 39.

The handle 46 can then be pulled out further and the entire spot filled with ground coffee will move outwardly to the position shown in FIGS. 3 and 5, where the spout is stopped by contact of peg 40 with the rear side of the bottom 30' of gasket 30. The upper side 30" of the gasket scrapes off excess coffee. The plate 44 is stopped at the rear side of the top 30" of gasket 30. It will be noted that this provides a substantially hermetic seal all around the rear end of the spout. The can may be now be turned on its side, tipped or even inverted to discharge all the loose ground coffee from the open top of the spout into a suitable coffee brewing utensil. The spout can then be pushed back along with handle 46 and plate 45, to the closed position of FIG. 4.

The abutment of the front panel 33 at the gasket 30 prevents loss of freshness, flavor and aroma and prevents ground coffee from spilling out. Even if the can should accidentally be tipped over when the spout is closed, the spout will not slide out because the ground coffee at the front of the plate 44 will prevent the plate from moving forward. In addition, the perihery of panel 33 in recess 32 is gripped frictionally by the gasket 30.

There has thus been provided, according to the invention, a novel closure for a container of granular material in the form of a spout which serves also as a measuring device for a predetermined quantity of the material. When the spout is open it serves to dispense the measured quantity of material. When the spout is closed it hermetically seals the container, preventing leakage or loss of any material as well as preventing loss of freshness, flavor and aroma.

The spouts 34 can be manufactured and installed in cans by conventional mass production metal and plastic working machinery at very low cost. They afford consumers greater service and satisfaction in use of ground materials packaged in cans. The invention is applicable to packaging of ground coffee, tea, and other granular materials.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by the United States Letters Patent is:

1. A combination closure and granular material measuring and dispensing construction for a container having a vertical side wall and a horizontal bottom wall attached to one end of said side wall, with a rectangular opening formed in said side wall near said bottom wall, comprising in combination, a rectangular gasket having one side secured inside said side wall around said rectangular opening, said gasket extending peripherally inwardly of said opening, a spout having a vertical front end panel abutting said side of the gasket within said opening, a pair of side panels and a bottom panel integrally joined at forward ends thereof to said front end panel, said spout being movable outwardly of said vertical side wall while the side and bottom panels abut inner edges of said gasket, a rectangular plate, and means movably supporting said plate so that the plate serves as a rear panel closure for the spout when the spout is moved outwardly of said side wall, said plate being normally spaced from rear ends of the side and bottom panels when the side and bottom panels are fully inserted inside the container, said plate being movable to push granular material into the spout when said plate is moved forwardly prior to moving the spout outwardly of said side wall of the container.

2. A combination closure and granular material measuring and dispensing construction for a container having a vertical side wall and a horizontal bottom wall attached to one end of said side wall, with a rectangular opening formed in said side wall near said bottom wall, comprising in combination, a rectangular gasket having one side secured inside said side wall around said rectangular opening, said gasket extending peripherally inwardly of said opening, a spout having a vertical front end panel abutting said side of the gasket within said opening, a pair of side panels and a bottom panel intergally joined at forward ends thereof to said front end panel, said spot being movable outwardly of said vertical side wall while the side and bottom panels abut inner edges of said gasket, a rectangular plate, a shaft movable supporting said plate while the plate rests slidably on said bottom wall, said shaft extending through said front end panel for manually moving said plate, said plate serving as a rear panel closure for the spout when the spout is moved outwardly of said wall, said plate being normally spaced from rear ends of the side and bottom panels when the side and bottom panels are fully inserted inside the container, said plate being movable to push granular material into the spout when said plate is moved forwardly prior to moving the spout outwardly of said side wall of the container.

3. A combination closure and granular material measuring and dispensing construction for a container having a vertical side wall and a horizontal bottom wall attached to one end of said side wall, with a rectangular opening formed in said side wall near said bottom wall, comprising in combination, a rectangular gasket having one side secured inside said side wall around said rectangular opening, said gasket extending peripherally inwardly of said opening, a spout having a vertical front end panel abutting said side of the gasket within said opening, a pair of side panels and a bottom panel integrally joined at forward ends thereof to said front end panel, said spout being movable outwardly of said vertical side wall while the side and bottom panels abut inner edges of said gasket, a rectangular plate, a shaft movably supporting said plate while the plate rests slidably on said bottom wall, said shaft extending through said front end panel for manually moving said plate, said plate serving as a rear panel closure for the spout when the spout is moved outwardly of said wall, said plate being normally spaced from rear ends of the side and bottom panels when the side and bottom panels are fully inserted inside the container, said plate being movable to push granular material into the spout when said plate is moved forwardly prior to moving the spout outwardly of said side wall of the container, and a support member extending downwardly from said bottom panel and slidably resting on said bottom wall to support the spout during movement in and out of the container.

4. A combination closure and granular material measuring and dispensing construction for a container having a vertical side wall and a horizontal bottom wall attached to one end of said side wall, with a rectangular opening formed in said side wall near said bottom wall, comprising in combination, a rectangular gasket having one side secured inside said side wall around said rectangular opening, said gasket extending peripherally inwardly of said opening, a spout having a vertical front end panel abutting said side of the gasket within said opening, a pair of side panels and a bottom panel integrally joined at forward ends thereof to said front end panel, said spout being movable outwardly of said vertical side wall while the side and bottom panels abut inner edges of said gasket, a rectangular plate, a shaft movably supporting said plate while the plate rests slidably on said bottom wall, said shaft extending through said front end panel for manually moving said plate, said plate serving as a rear panel closure for the spout when the spout is moved outwardly of said wall, said plate being normally spaced from rear ends of the side and bottom panels when the side and bottom panels are fully inserted inside the container, said plate being movable to push granular material into the spout when said plate is moved forwardly prior to moving the spout outwardly of said side wall of the container, said gasket having an upper edge extending across and abutting upper edges of said side panels for leveling granular material in the spout as the spout is moved outwardly of the container, said plate contacting said upper edge of the gasket when the spout is extended from the container.

5. A combination closure and granular material measuring and dispensing construction for a container having a vertical side wall and a horizontal bottom wall attached to one end of said side wall, with a rectangular opening formed in said side wall near said bottom wall, comprising in combination, a rectangular gasket having one side secured inside said side wall around said rectangular opening, said gasket extending peripherally inwardly of said opening, a spout having a vertical front end panel abutting said side of the gasket within said opening, a pair of side panels and a bottom panel integrally joined at forward ends thereof to said front end panel, said spout being movable outwardly of said vertical side wall while the side and bottom panels abut inner edges of said gasket, a rectangular plate, a shaft movably supporting said plate while the plate rests slidably on said bottom wall, said shaft extending through said front end panel for manually moving said plate, said plate serving as a rear panel closure for the spout when the spout is moved outwardly of said wall, said plate being normally spaced from rear ends of the side and bottom panels when the side and bottom panels are fully inserted inside the container, said plate being movable to push granular material into the spout when said plate is moved forwardly prior to moving the spout outwardly of said side wall of the container, said gasket having an upper edge extending across and abutting upper edges of said side panels for leveling granular material in the spout as the spout is moved outwardly of the container, said plate contacting said upper edge of the gasket when the spout is extended from the container, and a support member extending downwardly from said bottom panel and slidably resting on said bottom wall to support the spout during movement in and out of the container.

6. A combination closure and granular material measuring and dispensing construction for a container having a vertical side wall and a horizontal bottom wall attached to one end of said side wall, with a rectangular opening formed in said side wall near said bottom wall, comprising in combination, a rectangular gasket having one side secured inside said side wall around said rectangular opening, said gasket extending peripherally inwardly of said opening, a spout having a vertical front end panel abutting said side of the gasket within said opening, a pair of side panels and a bottom panel integrally joined at forward ends thereof to said front end panel, said spout being movable outwardly of said vertical side wall while the side and bottom panels abut inner edges of said gasket, a rectangular plate, a shaft movably supporting said plate while the plate rests slidably on said bottom wall, said shaft extending through said front end panel for manually moving said plate, said plate serving as a rear panel closure for the spout when the spout is moved outwardly of said wall, said plate being normally spaced from rear ends of the side and bottom panels when the side and bottom panels are fully inserted inside the container, said plate being movable to push granular material into the spout when said plate is moved forwardly prior to moving the spout outwardly of said side wall of the container, said gasket having an upper edge extending across and abutting upper edges of said side panels for leveling granular material in the spout as the spout is moved outwardly of the container, said plate contacting said upper edge of the gasket when the spout is extended from the container, and a handle on the end of said shaft for moving the shaft axially through said end panel, said end panel having a recess formed therein receiving said handle so that the handle has an outer edge disposed parallel to said end panel when the handle is disposed in said recess.

7. A combination closure and granular material measuring and dispensing construction for a container having a vertical side wall and a horizontal bottom wall attached to one end of said side wall, with a rectangular opening formed in said side wall near said bottom wall, comprising in combination, a rectangular gasket having one side secured inside said side wall around said rectangular opening, said gasket extending peripherally inwardly of said opening, a spout having a vertical front end panel abutting said side of the gasket within said opening, a pair of side panels and a bottom panel integrally joined at forward ends thereof to said front end panel, said spout being movable outwardly of said vertical side wall while the side and bottom panels abut inner edges of said gasket, a rectangular plate, a shaft movably supporting said plate while the plate rests slidably on said bottom wall, said shaft extending through said front end panel for manually moving said plate, said plate serving as a rear panel closure for the spout when the spout is moved outwardly of said wall, said plate being normally spaced from rear ends of the side and bottom panels when the side and bottom panels are fully inserted inside the container, said plate being movable to push granular material into the spout when said plate is moved forwardly prior to moving the spout outwardly of said side wall of the container, said gasket having an upper edge extending across and abutting upper edges of said side panels for leveling granular material in the spout as the spout is moved outwardly of the container, said plate contacting said upper edge of the gasket when the spout is extended from the container, said gasket having a recess extending all around said one side thereof, said front end panel fitting frictionally in said recess to define with said gasket a hermetic seal for said opening in the side wall of the container.

8. A combination closure and granular material measuring and dispensing construction for a container having a vertical side wall and a horizontal bottom wall, comprising in combination a spout having a vertical front end panel, a pair of side panels and a bottom panel integrally joined at forward ends thereof to said front end panel, said side wall having a rectangular groove weakening the side wall around said front end panel and defining a removable wall section, and a tab attached to said wall section and extending outwardly thereof for engagement by a slotted key to twist said wall section away from the side wall and form a rectangular opening for passing said spout therethrough, a shaft movable axially through said end panel, a plate secured to one end of the shaft inside the container beyond said spout, said plate being movable by said shaft to serve as a rear end panel for the spout, and a handle on the other end of said shaft outside of said front end panel for moving simultaneously the shaft, plate and spout.

9. A combination closure and granular material measuring and dispensing construction for a container having a cylindrical side wall and a circular bottom closing and attached to one end of said side wall, comprising a rectangular gasket secured inside said side wall at the circular bottom, said gasket having a rectangular opening therein, a spout having a vertical front end panel, a bottom panel integrally joined to the front end panel, and a pair of parallel side panels integrally joined to lateral edges of the front panel and bottom panel; said side and bottom panels being slidably fitted in the opening in the gasket, said gasket having a forward side at the cylindrical side wall formed with a rectangular recess, said front end panel fitting snugly in said recess, said front end panel having a concavity formed therein, said front panel having a hole centered in said concavity, a shaft extending slidably through the hole in the front panel, a knob at one end of the shaft disposed in said concavity, a plate secured to the other end of the shaft and normally spaced from rear ends of said side and bottom panels, said cylindrical side wall having a rectangular groove weakening the side wall around the gasket and defining a removable rectangular wall section, and a tab attached to said side wall section within said groove and adapted to be engaged by a slotted key for twisting said wall section away from the side wall to define a rectangular other opening thereat and to expose said front panel, said knob, and part of the forward side of said gasket, whereby said spout may be drawn out through said other opening by pulling said handle and shaft outwardly of said side wall and front panel while said plate abuts rear ends of the sides and bottom panels of the spout and defines a rear panel for said spout.

References Cited in the file of this patent

UNITED STATES PATENTS

| | | |
|---|---|---|
| 1,999,624 | Biazzi et al. | Apr. 30, 1935 |
| 2,162,286 | Siefert | June 13, 1939 |
| 2,323,565 | Peters | July 6, 1943 |
| 2,500,059 | Burnham | Mar. 7, 1950 |
| 2,784,884 | Borie | Mar. 12, 1957 |
| 3,055,539 | Pillnik | Sept. 25, 1962 |
| 3,077,213 | Germano | Feb. 12, 1963 |